Figure 1:
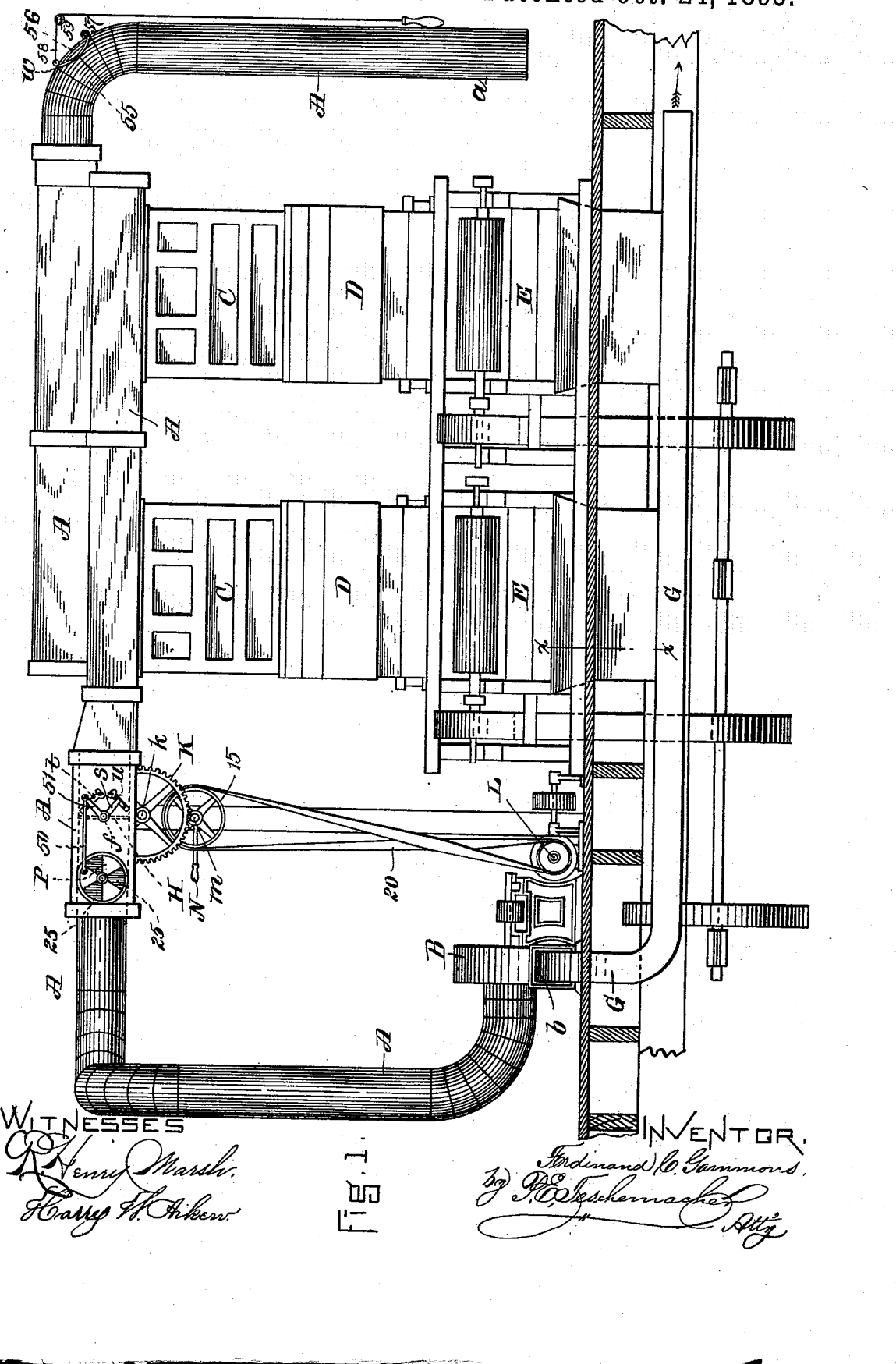

(No Model.) 2 Sheets—Sheet 1.

F. C. GAMMONS.
SEED COTTON CONVEYER.

No. 507,358. Patented Oct. 24, 1893.

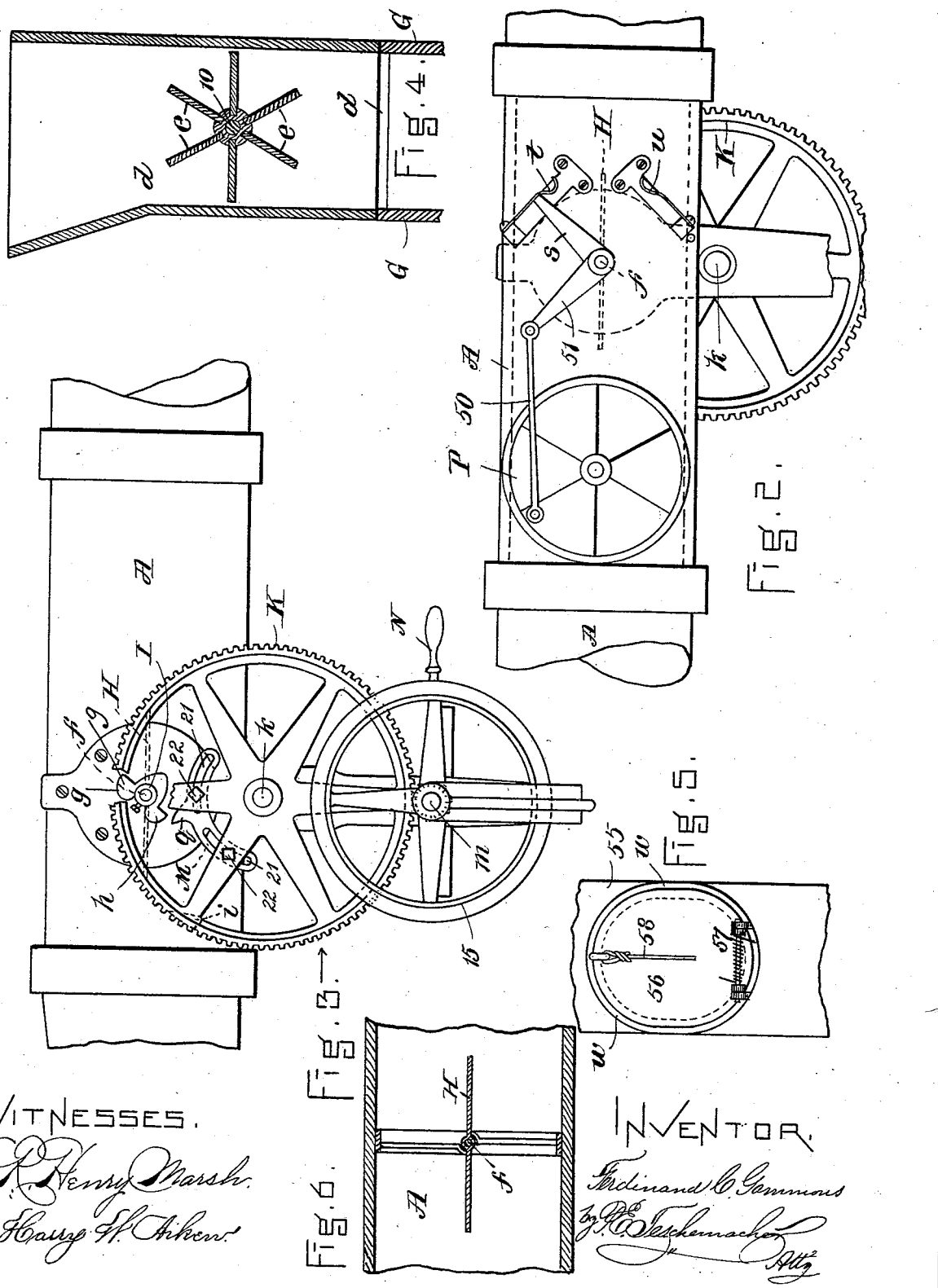

UNITED STATES PATENT OFFICE.

FERDINAND C. GAMMONS, OF BRIDGEWATER, MASSACHUSETTS, ASSIGNOR TO THE EAGLE COTTON GIN COMPANY, OF SAME PLACE.

SEED-COTTON CONVEYER.

SPECIFICATION forming part of Letters Patent No. 507,358, dated October 24, 1893.

Application filed July 17, 1893. Serial No. 480,758. (No model.)

*To all whom it may concern:*

Be it known that I, FERDINAND C. GAMMONS, a citizen of the United States, residing at Bridgewater, in the county of Plymouth and State of Massachusetts, have invented certain Improvements in Seed-Cotton Conveyers, of which the following is a full, clear, and exact description, reference being had to the accompanying drawings, making part of this specification in which—

Figure 1 is a side elevation of a pneumatic seed-cotton conveyer having my improvements applied thereto. Fig. 2 is an enlarged view of a portion of the same, showing the air or cut-off valve and the damper or register which admits air to the pneumatic tube between the exhaust fan and the cut-off valve when the latter is closed. Fig. 3 is an enlarged view of the cut-off valve operating mechanism, showing the same on the side of the pneumatic tube opposite to that illustrated in Figs. 1 and 2. Fig. 4 is an enlarged vertical section through the cotton seed blast or discharge tube on the line $xx$ of Fig. 1. Fig. 5 is a detail to be referred to. Fig. 6 is a longitudinal vertical section of a portion of the pneumatic tube, showing the cut-off valve open.

My invention relates to pneumatic apparatus for conveying seed-cotton from a wagon, storehouse, or bin to the cotton gin feeders; and my invention consists in the construction and combination of devices which I shall hereinafter fully describe and claim.

In the said drawings, A represents the pneumatic tube of a seed-cotton conveyer, one end, $a$, of which is adapted to be placed over a wagon, bin or other place or receptacle from which the cotton is to be drawn by suction and carried forward to the cotton-gin feeders, the suction being produced by means of an exhaust-fan or blower B connected with the tube A at a point opposite to that where the cotton is received. Connected with the tube A are a series of cotton receiving boxes C placed over a corresponding number of cotton-gin feeders D, by which the cotton is conducted to the cotton-gins E arranged beneath the same as shown in Fig. 1.

G is a blast-tube connected with the fan or blower B at $b$, said tube extending horizontally beneath the cotton-gins E and being provided with suitable inlet openings $d$, Fig. 4, through which the cotton seeds drop from the gins above into the blast-tube G through which they are blown by the blast and usually discharged into a small building adjacent to the gin-house. The openings $d$ are each provided with a revolving shaft 10 having radial wings or blades $e$, Fig. 4, which serve to prevent the escape of the air from the opening, the seeds as they drop from the gin above, falling into the angles between the wings and being carried around and dropped into the tube G as the wings revolve. This device is however well known and forms no part of my invention.

Beyond the last receiving box C and between it and the exhaust-fan B, the pneumatic tube A is provided with a cut-off valve H which is opened periodically, preferably once in about sixty seconds, to shut off the suction or draft of air through said tube A and permit the cotton to fall from the boxes C into the feeders D beneath. The cut-off valve H consists of a plate which is mounted upon a shaft or spindle $f$ passing centrally through it, whereby said valve may be turned into a horizontal position to allow of the passage of the air, or into a vertical position to completely fill said tube and shut off the passage of the air to the exhaust fan B.

To one end of the spindle $f$ is secured a collar I provided with two diametrically opposite teeth or projections $g$, $h$, the former $g$ being adapted to be struck or engaged to close the valve H by a fixed tooth or projection $i$ shown dotted in Fig. 3, at or near the periphery of a gear K mounted on a stud $k$ and meshing with a pinion on a shaft $m$ which is provided with a pulley 15 driven by a belt 20 from a pulley on the main driving-shaft L, as shown in Fig. 1.

M is a curved plate or bar secured to the gear K about half way between the center and the periphery, and made adjustable on said gear in the arc of a circle by means of slots 21 and clamping screws 22, said plate M being provided with a tooth or projection $q$ which is arranged to come into contact with the projection $h$ of the collar I to open the valve H, the relative arrangement of the teeth or projections $i$, $q$, being such that the valve H, after being closed by the projection $i$, will not be again opened by the projection $q$ until sufficient time has elapsed to permit all of the cotton to drop out of the cotton-receiving boxes C. The pinion on the shaft $m$ is thrown into and out of engagement with the pulley 15 by means of a clutch operated by a lever N when it is desired to start or stop the valve-operating mechanism.

To the end of the valve spindle $f$ opposite to that carrying the collar I is secured an arm $s$, Figs. 1 and 2, which is adapted to engage the spring catches $t$, $u$, secured to the outside of the tube A, said catches forming friction devices which serve to retain the valve H securely in position when opened or closed, but yielding readily to permit the valve to be moved from one position to the other by its actuating mechanism.

The above described mechanism for periodically actuating the air or cut-off valve H is similar to that described in Letters Patent of the United States, No. 500,804, granted to me July 4, 1893, and although I prefer to use said mechanism, any other suitable mechanism or means may be employed for opening and closing said valve at the proper times to accomplish the desired end, or said valve may be adapted to be opened by hand.

The suction tube A is provided between the air or cut-off valve H and the exhaust fan or blower B with a damper or register P of any suitable or approved construction, through which air may be admitted to supply the fan B, said damper P being adapted to be opened, as shown in Fig. 1, when the cut-off valve H is closed, and closed, as shown in Fig. 2 to prevent the admission of air at this point, when the cut-off valve is opened, whereby when said cut-off valve is closed to cut off the suction, air will be supplied to the fan or blower B through the register P to maintain a steady and continuous blast through the tube G, thereby preventing any interruption in the discharge of the cotton seeds therefrom, which would occur if no provision was made for supplying the fan or blower with air when the valve H is closed, all liability of the blast tube G becoming clogged with seed being thereby avoided. The damper or register P here shown consists of a circular plate or disk adapted to turn on a central pivot and provided with apertures 25 adapted to be brought into line with corresponding apertures in the side of the tube A, and in order that the said damper or register may be actuated simultaneously with the cut-off valve H, they are connected by a rod 50, which is pivoted at one end to the damper P, and at the other end to an arm 51 secured to the valve spindle $f$, whereby as the cut-off valve H is closed, as shown dotted in Fig. 1, by the mechanism above described, the damper P will be opened to admit air to the fan or blower, and closed when the cut-off valve is opened, as shown dotted in Fig. 2, said damper P when closed as shown in Fig. 2 making the tube A airtight at this point in order that there may be no interference with the full force of the suction or inward draft through said tube. I do not wish to confine myself to this method of operating the damper P as it can be connected with any other suitable portion of the mechanism which will actuate it at the required times, or it may even be operated by hand if desired without departing from the spirit of my invention.

The elbows 55 of the exhaust tube A above the inlet end which receives the cotton is provided with an opening $w$ kept normally closed by a door or cover 56, Figs. 1 and 5, having a spring hinge 57, said door being preferably provided with suitable means such as a cord 58 passing over a pulley 59, by which it can be opened against the resistance of the hinge-spring to produce an inward rush or suction of the air at this point for the purpose of clearing the tube A in case it becomes clogged with cotton at the elbow, which is liable to occur if the cotton is fed too rapidly to the inlet end of the tube, this device enabling the said tube to be readily kept clear and free from obstruction at all times.

What I claim as my invention, and desire to secure by Letters Patent, is—

1. In a seed-cotton conveyer, the combination of the pneumatic conveyer-tube A provided with an air or cut-off valve H, a shaft or spindle $f$ having an arm 51, and mechanism for automatically operating the said valve, the exhaust-fan or blower B connected with the tube A, the blast-tube G connected with the said exhaust-fan or blower, the damper or register P located in the pneumatic tube A between the cut-off valve H and the exhaust-fan or blower B, and the connecting-rod 50 pivoted to the damper P and to the arm 51 of the shaft $f$, whereby the cut-off valve and damper are actuated simultaneously in such manner that when one is closed the other will be opened, substantially as and for the purpose set forth.

2. In a seed cotton conveyer, the combination of the pneumatic conveyer tube A provided at its elbow above the inlet end which receives the cotton with an opening $w$, a door or cover for said opening having a spring hinge for keeping the cover normally closed, and means for opening said door or cover against the resistance of the spring to produce an inward draft or suction at the elbow to clear or free the same from obstruction.

Witness my hand, this 12th day of July, A. D. 1893.

FERDINAND C. GAMMONS.

In presence of—
P. E. TESCHEMACHER,
HARRY W. AIKEN.